US008265606B2

(12) United States Patent
Ghotge et al.

(10) Patent No.: US 8,265,606 B2
(45) Date of Patent: Sep. 11, 2012

(54) TARGETED ADVERTISEMENTS TO SOCIAL CONTACTS

(75) Inventors: Vishal V. Ghotge, Seattle, WA (US); Bo Lu, Seattle, WA (US); Karl P. Karlsson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 12/248,720

(22) Filed: Oct. 9, 2008

(65) Prior Publication Data

US 2010/0093317 A1 Apr. 15, 2010

(51) Int. Cl.
*H04M 3/42* (2006.01)
(52) U.S. Cl. .............. 455/414.1; 705/14.49; 705/14.4; 705/14.41; 705/14.44
(58) Field of Classification Search .......... None
See application file for complete search history.

(56) References Cited

U.S. PATENT DOCUMENTS

| | | | | |
|---|---|---|---|---|
| 6,832,245 | B1 * | 12/2004 | Isaacs et al. ........... | 709/206 |
| 6,883,000 | B1 | 4/2005 | Gropper | |
| 2004/0098615 | A1 | 5/2004 | Mowers et al. | |
| 2006/0053449 | A1 | 3/2006 | Gutta | |
| 2006/0062094 | A1 | 3/2006 | Nathan | |
| 2006/0168059 | A1 * | 7/2006 | Chang et al. ........... | 709/206 |
| 2006/0212355 | A1 | 9/2006 | Teague | |
| 2006/0224446 | A1 | 10/2006 | Fox | |
| 2007/0156522 | A1 | 7/2007 | Carpenter | |
| 2008/0046311 | A1 | 2/2008 | Shahine | |
| 2008/0109306 | A1 * | 5/2008 | Maigret et al. ........... | 705/14 |
| 2008/0154915 | A1 | 6/2008 | Flake | |
| 2009/0147778 | A1 * | 6/2009 | Wanless et al. ........... | 370/389 |
| 2009/0222348 | A1 * | 9/2009 | Ransom et al. ........... | 705/14 |
| 2009/0312040 | A1 * | 12/2009 | Gupta et al. ........... | 455/466 |
| 2010/0093317 | A1 | 4/2010 | Ghotge | |

OTHER PUBLICATIONS

"A Tour of Online Advertising's Two-Way Mirrors", Retrieved from http://www.democraticmedia.org/current_projects/privacy/analysis/adv_two_way_mirrors on Jul. 30, 2008., (Mar. 27, 2007),pp. 1-12.
"Orkut Allows Users to Publish Ads on Profile Pages—Is it Just a Rumor?", Retrieved from http://www.watblog.com/2008/06/08/orkut-allows-users-to-publish-ads-on-profile-pages-is-it-just-a-rumor/ on Jul. 30, 2008., 12 Pages.
Eldon, Eric "Facebook Ad Network Lookery Hits its Billion-Impression Target; Social Networking Doomed?", Retrieved from: <http://venturebeat.com/2008/03/21/facebook-ad-network-lookery-hits-its-billion-impression-target-social-networking-doomed/> on Jul. 30, 2008., (Mar. 21, 2008),7 Pages.
Olsen, Stefanie "33Across: The Next Generation of Behavioral Ad Targeting", Retrieved from: <http://news.cnet.com/8301-10784_3-9974210-7.html> on Jul. 30, 2008., (Jan. 23, 2008),4 Pages.

* cited by examiner

*Primary Examiner* — Rafael Pérez-Gutiérrez
*Assistant Examiner* — Suhail Khan
(74) *Attorney, Agent, or Firm* — Wolfe SBMC

(57) ABSTRACT

Targeted advertisements to social contacts is described. In embodiment(s), social contacts can be correlated based on messaging interactions between mobile communication devices that are associated with the social contacts. Feedback about an advertisement can be received from mobile communication devices that are associated with the social contacts, and the advertisement can then be targeted to one or more of the social contacts based on the feedback about the advertisement.

9 Claims, 5 Drawing Sheets

TARGETED ADVERTISEMENTS TO SOCIAL CONTACTS

BACKGROUND

Mobile phones and other mobile communication devices are common in our society and are increasingly used for not only communication, but to store different types of information and data, such as personal and business information, documents, pictures, and other types of data. Mobile phones typically have connectivity to a voice network for voice and messaging communications, and may also be connected to a data network for Internet access and data communication. Given the ever increasing number of people that use mobile phones, advertisers of goods and services seek techniques to deliver advertisements to the mobile phone users.

Collaborative filtering is a common technique used to help determine the types of goods and/or services that a particular group of people may be interested in. A problem with collaborative filtering, however, is being able to associate a group of people. Traditional techniques for collaborative filtering use characteristics of the people in a group, such as age, gender, race, and/or location to create a group. However, these traditional techniques rely on a presumption that people having some similar characteristics also share similar interests, such as in goods purchased and available services. These traditional techniques associate people that do not know each other into groups, and the people may not have common interests or even any basis from which to determine a likelihood of interest in the same advertisements.

SUMMARY

This summary is provided to introduce simplified concepts of targeted advertisements to social contacts. The simplified concepts are further described below in the Detailed Description. This summary is not intended to identify essential features of the claimed subject matter, nor is it intended for use in determining the scope of the claimed subject matter.

Targeted advertisements to social contacts is described. In embodiment(s), social contacts can be correlated based on messaging interactions between mobile communication devices that are associated with the social contacts. Feedback about an advertisement can be received from mobile communication devices that are associated with the social contacts, and the advertisement can then be targeted to one or more of the social contacts based on the feedback about the advertisement.

In other embodiment(s) of targeted advertisements to social contacts, the feedback about a first advertisement can be received from one or more of the mobile communication devices that are associated with the social contacts, and then a different, similar, or related advertisement can be targeted to one or more of the social contacts based on the feedback about the first advertisement. The feedback received about an advertisement can include a selectable input to the mobile communication devices to initiate rendering the advertisement at the mobile communication devices. For example, a user of a mobile communication device can initiate a selectable input to display a video, an image, a graphic, or text of the advertisement, or initiate a selectable input to playback audio of the advertisement at the mobile communication device.

In other embodiment(s) of targeted advertisements to social contacts, the feedback received about an advertisement can include a selectable input to one or more of the mobile communication devices (i.e., from a user of a device) to dismiss the advertisement and/or rate the advertisement. The feedback received about an advertisement can also include a recommendation of the advertisement for a social contact. The advertisement can then be targeted to the mobile communication device that is associated with the social contact based on the recommendation of the advertisement. Alternatively, the advertisement can then be targeted to the mobile communication devices that are associated with all or several of the social contacts based on the recommendation of the advertisement.

BRIEF DESCRIPTION OF THE DRAWINGS

Embodiments of targeted advertisements to social contacts are described with reference to the following drawings. The same numbers are used throughout the drawings to reference like features and components.

DETAILED DESCRIPTION

Embodiments of targeted advertisements to social contacts provide techniques to target advertisements to social contacts that are correlated based on messaging interactions between mobile communication devices that are associated with the social contacts. For example, the members of a social group (i.e., the social contacts) can use instant messaging (IM) to communicate with each other via respective mobile communication devices. The social contacts can be correlated based on the messaging, and then targeted or recommended advertisements can be communicated to the social contacts (e.g., via the respective mobile communication devices). The social contacts can be correlated based on a likelihood that instant messaging clients are friends, and therefore have common interests. There is also a likelihood that social contacts will select to view a targeted or recommended advertisement that has been selected for viewing by another user in the group of social contacts.

While features and concepts of the described systems and methods for targeted advertisements to social contacts can be implemented in any number of different environments, systems, and/or various configurations, embodiments of targeted advertisements to social contacts are described in the context of the following example systems and environments.

Figure 1:
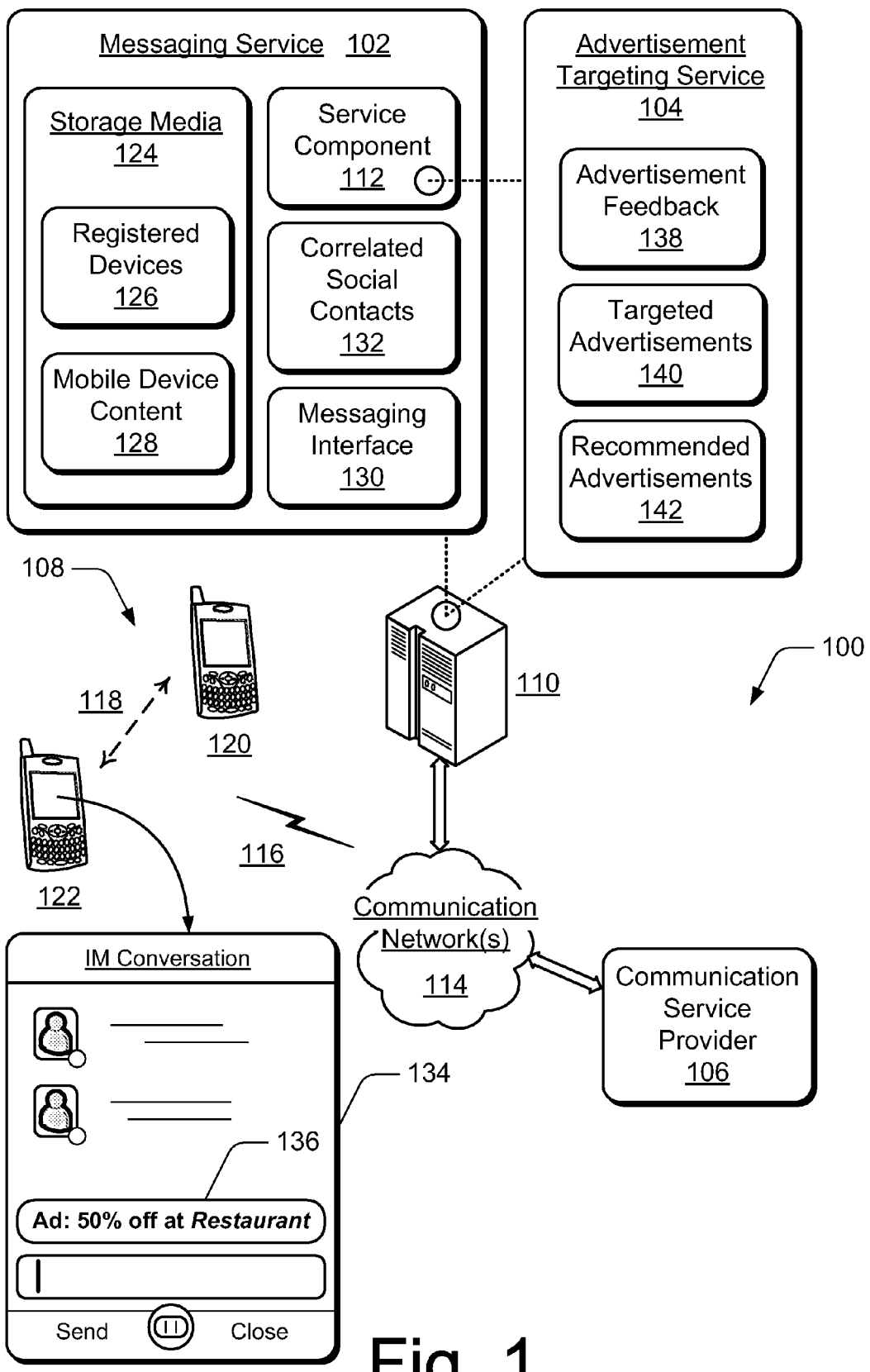
FIG. 1 illustrates an example system in which embodiments of targeted advertisements to social contacts can be implemented.

FIG. 1 illustrates an example system 100 in which various embodiments of targeted advertisements to social contacts can be implemented. Example system 100 includes a messaging service 102, an advertisement targeting service 104, and a communication service provider 106 that facilitates mobile data and/or voice communications. For example, the communication service provider 106 may be a cell-phone provider, an Internet service provider, and/or a combination thereof. The communication service provider 106 enables data, messaging, and/or voice communications for any type of mobile communication devices 108, such as for various mobile phones (e.g., cellular, VoIP, WiFi, etc.), and/or any other wireless media or communication device that can receive message, data, voice, or media content in any form of audio, video, and/or image data.

The messaging service 102 and the advertisement targeting service 104 can each be implemented as independent or third-party services to implement the various embodiments of targeted advertisements to social contacts as described herein. Alternatively, the messaging service 102 and/or the advertisement targeting service 104 can each be implemented as components or services of a networked server 110 that is implemented to facilitate social networking application(s).

In an embodiment, the messaging service 102 includes the advertisement targeting service 104 as a service component 112 of the messaging service 102. The advertisement targeting service 104 can be implemented as computer-executable instructions and executed by processor(s) to implement the various embodiments and/or features for targeted advertisements to social contacts as described herein. In addition, the advertisement targeting service 104 can be implemented with any number and combination of differing components as further described with reference to the example service shown in FIG. 4.

The messaging service 102, advertisement targeting service 104, communication service provider 106, and networked server 110 can all be implemented for communication via communication network(s) 114 that can include any type of a data network, voice network, broadcast network, an IP-based network, and/or a wireless network 116 that facilitates data, messaging, and/or voice communications with mobile communication devices 108. The communication network(s) 114 can be implemented using any type of network topology and/or communication protocol, and can be represented or otherwise implemented as a combination of two or more networks. Any one or more of the arrowed communication links facilitate two-way data communication, such as from a mobile communication device 108 to the communication service provider 106 and vice-versa. In various embodiments, the communication service provider 106 provides the integration between the services and the various data, messaging, and voice communication networks.

The mobile communication devices 108 can be implemented with one or more processors, communication components, memory components, and signal processing and control circuits. A mobile communication device also includes an integrated display and selectable input controls via which a user can input messaging data for instant messaging. The mobile communication devices 108 can include a social networking application implemented to facilitate messaging 118 between the devices (e.g., instant messaging via the messaging service 102 and/or the communication service provider 106), such as from mobile communication device 120 to mobile communication device 122 and vice-versa. Although only two mobile communication devices 120, 122 are shown in FIG. 1, any number of mobile communication devices are contemplated for social networking and messaging.

In various embodiments, a mobile communication device 108 can be implemented with any number and combination of differing components as further described with reference to the example device shown in FIG. 5. A mobile communication device 108 may also be associated with a user or owner (i.e., a person) and/or an entity that operates the device such that a mobile communication device describes logical devices that include users, software, and/or a combination of devices.

In this example, the messaging service 102 includes storage media 124 to store or otherwise maintain various data and media content, such as a database of registered devices 126 and mobile device content 128. The storage media 124 can be implemented as any type of memory or other suitable electronic data storage. The mobile device content 128 that is maintained by the storage media 124 can include any type of device data, such as configuration settings of the mobile communication devices 108, information associated with users of the mobile communication devices, and/or messaging content that has been received and/or communicated via the devices.

The database of registered devices 126 can include identifiers of the mobile communication devices 108 that are registered with the messaging service 102 and/or registered via the communication service provider 106. A unique identifier can be established for a particular mobile communication device, and the unique identifier can include any one or combination of a user identifier, a device or phone identifier, a phone number, and/or any other identifier that can be utilized for registration authentication of a mobile communication device.

The messaging service 102 also includes a messaging interface 130 to receive and communicate instant messages between the mobile communication devices 108. The messaging service 102 can be implemented to correlate social contacts 132 based on messaging interactions between the mobile communication devices 108 that are associated with the social contacts. The users of the mobile communication devices 108 can be identified as members of a social group that are the correlated social contacts 132 in a social graph. The social contacts 132 can be correlated in a social graph at the messaging service 102 based on instant messaging, other communications (e.g., email messages, text messages, pages, etc.), and/or based on a frequency of the messaging between the mobile communication devices associated with the social contacts.

An instant messaging interface 134 displayed on a mobile communication device 122 can include a display of an advertisement 136, or a selectable input for the advertisement. A user of the mobile communication device 122 can then initiate to interact or select the advertisement 136 from the messaging interface 134 on a mobile communication device. For example, a user can click or otherwise select the advertisement 136 to receive more information, dismiss the advertisement, rate the advertisement, recommend the advertisement, or optionally, not respond. User interaction with the advertisement 136 at the mobile communication device 122 is then communicated as advertisement feedback 138 to the advertisement targeting service 104 via the messaging interface 130. The advertisement feedback 138 can be received from any of the mobile communication devices 108 that are associated with the social contacts 132.

In embodiments, the advertisement targeting service 104 can target the advertisement 136 as a targeted advertisement 140 to any of the correlated social contacts 132 based on the feedback about the advertisement. For example, the advertisement targeting service 104 can communicate a targeted advertisement 140 to the mobile communication devices 108 that are associated with the respective correlated social contacts 132. Alternatively or in addition, the advertisement targeting service 104 can receive the advertisement feedback 138 about the advertisement 136, and then target a different, similar, or related targeted advertisement 140 to the correlated social contacts 132 based on the feedback about the advertisement 136.

The advertisement feedback 138 that is received about the advertisement 136 can include a user at the mobile communication device 122 selecting the advertisement to initiate rendering the advertisement at the mobile communication device. For example, audio of the advertisement 136 can be played back and/or the advertisement 136 can be displayed for viewing at the mobile communication device as a video, an image, a graphic, a coupon, and/or text of the advertisement. The advertisement feedback 138 is then an indication that the user selected the advertisement 136 for viewing at the mobile communication device 122.

The advertisement feedback 138 received about the advertisement 136 can also include an indication that the user at the mobile communication device 122 dismissed the advertisement and/or entered a rating for the advertisement. The advertisement feedback 138 received about the advertisement 136 can also include a recommendation from the user at the mobile communication device 122 to send the advertisement to any of the correlated social contacts 132. The advertisement targeting service 104 can then target the advertisement 136 as a recommended advertisement 142 to the mobile communication device that is associated with the social contact based on the recommendation of the advertisement. Alternatively or in addition, the advertisement targeting service 104 can target the advertisement 136 as a recommended advertisement 142 to some or all of the mobile communication devices 108 that are associated with the correlated social contacts 132 based on the recommendation of the advertisement.

Figure 2:
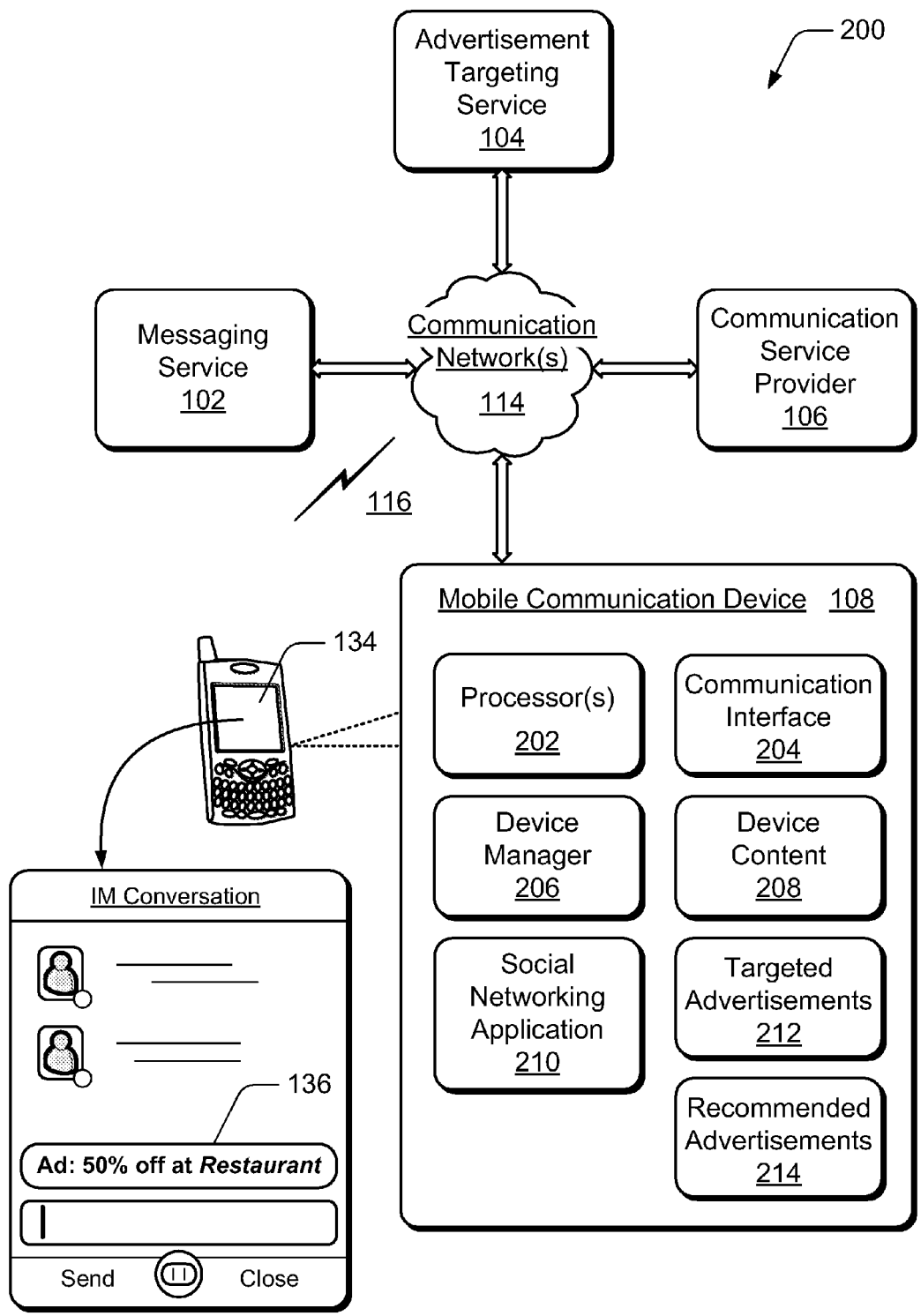
FIG. 2 illustrates another example system in which embodiments of targeted advertisements to social contacts can be implemented.

FIG. 2 illustrates another example system 200 in which various embodiments of targeted advertisements to social contacts can be implemented. Example system 200 includes the messaging service 102, advertisement targeting service 104, communication service provider 106, and a mobile communication device 108 that are all implemented for communication via the communication network(s) 114 and/or the wireless network 116. Examples and implementations of each are described with reference to FIG. 1. In this example system 200, the messaging service 102 and the advertisement targeting service 104 can each be implemented as a subscription-based service, an independent service, and/or a third-party service to implement the various embodiments of targeted advertisements to social contacts as described herein.

In this example, the mobile communication device 108 includes one or more processors 202 (e.g., any of microprocessors, controllers, and the like), a communication interface 204 (e.g., to receive and/or communicate data, messaging, and voice communications), and a device manager 206 (e.g., a control application, software application, signal processing and control module, etc.). The mobile communication device 108 also includes device content 208, such as configuration settings of the device, media content stored on the device, information associated with a user of the device, business or personal information, documents, and/or messaging content that has been received and/or communicated via the mobile communication device.

In this example, the mobile communication device 108 includes a social networking application 210 that can be implemented as computer-executable instructions and executed by the processors 202 to implement various embodiments and/or features of targeted advertisements to social contacts. The device manager 206 can interface with the social networking application 210 to initiate communication with the messaging service 102, advertisement targeting service 104, and/or the communication service provider 106 via the communication interface 204.

The social networking application 210 can be implemented to facilitate messaging between devices (e.g., instant messaging via the messaging service 102 and/or the communication service provider 106). The social networking application 210 can include an embodiment of the instant messaging interface 134 that is displayed at the mobile communication device 108. The instant messaging interface includes a display of the advertisement 136 that a user can select which then initiates communication of advertisement feedback about the advertisement to the advertisement targeting service 104. Based on the advertisement feedback about the advertisement 136, the mobile communication device 108 can receive targeted advertisements 212 and/or recommended advertisements 214 from the advertisement targeting service 104 via the communication interface 204.

Example method 300 is described with reference to FIG. 3 in accordance with one or more embodiments of targeted advertisements to social contacts. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example method 300 may be described in the general context of computer-executable instructions, which can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
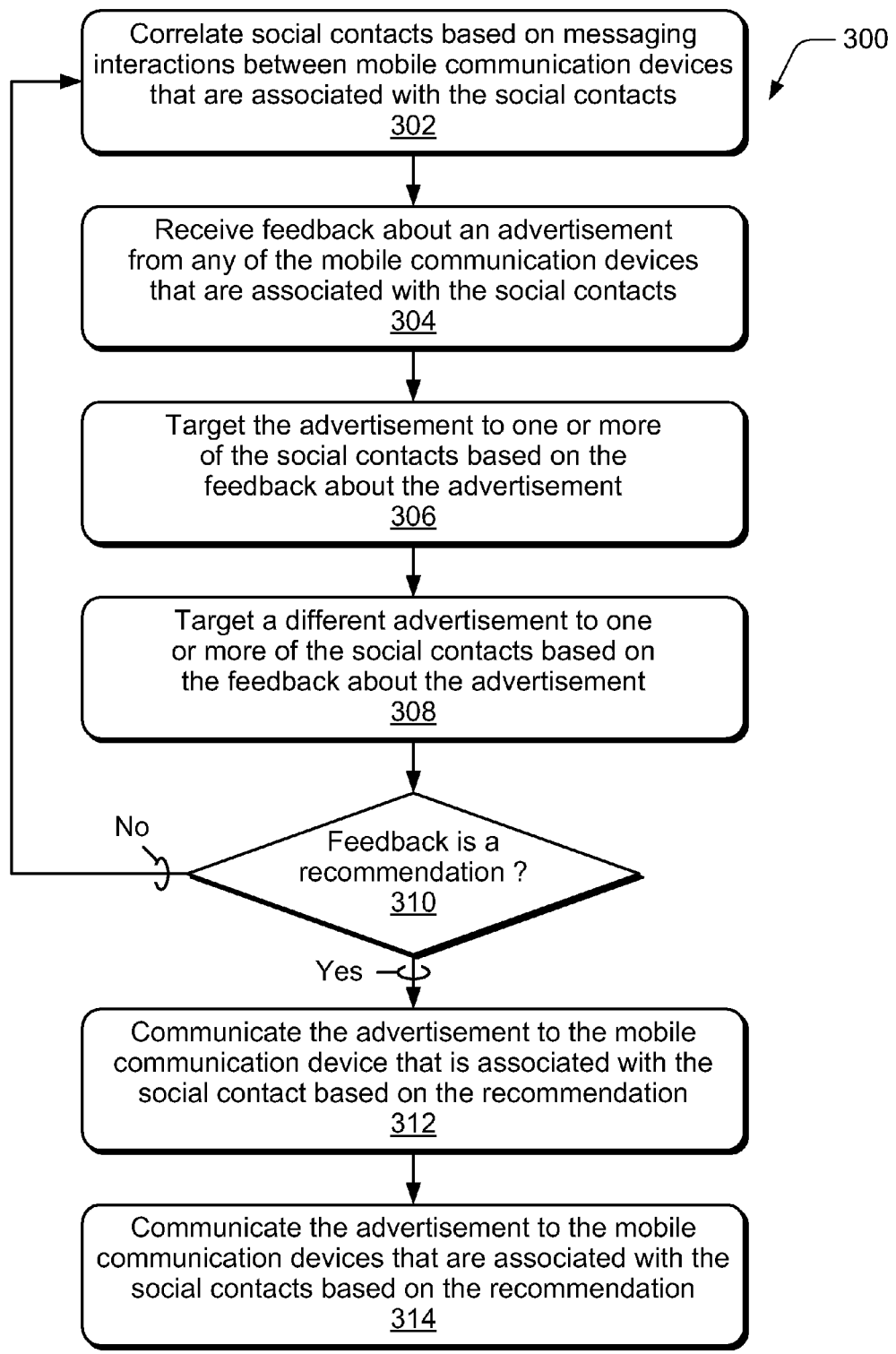
FIG. 3 illustrates example method(s) for targeted advertisements to social contacts in accordance with one or more embodiments.

FIG. 3 illustrates example method(s) 300 of targeted advertisements to social contacts. The order in which the method is described is not intended to be construed as a limitation, and any number of the described method blocks can be combined in any order to implement the method, or an alternate method.

At block 302, social contacts are correlated based on messaging interactions between mobile communication devices that are associated with the social contacts. For example, the messaging service 102 (FIG. 1) correlates the social contacts 132 based on messaging interactions (e.g., instant messaging and/or other communications) between the mobile communication devices 108 that are associated with the social contacts.

At block 304, feedback about an advertisement is received from any of the mobile communication devices that are associated with the social contacts. For example, the advertisement targeting service 104 receives advertisement feedback 138 from the mobile communication devices 108 that are associated with the correlated social contacts 132. The feedback received about an advertisement can include a selectable input to the mobile communication devices to initiate rendering the advertisement at the devices. For example, audio of the advertisement 136 can be played back and/or the advertisement 136 can be displayed for viewing at a mobile communication device as a video, an image, a graphic, a coupon, and/or text of the advertisement. Alternatively or in addition, the advertisement feedback 138 received about an advertisement can include an indication that a user at a mobile communication device dismissed the advertisement and/or entered a rating for the advertisement.

At block 306, the advertisement is targeted to one or more of the social contacts based on the feedback about the advertisement. For example, the advertisement targeting service 104 communicates the advertisement as a targeted advertisement 140 to the mobile communication devices 108 that are associated with the respective correlated social contacts 132.

At block 308, a different advertisement is targeted to one or more of the social contacts based on the feedback about the advertisement. For example, the advertisement targeting service 104 receives the advertisement feedback 138 about the advertisement 136, and then targets a different, similar, or related targeted advertisement 140 to the correlated social contacts 132 based on the feedback about the first advertisement 136.

At block 310, a determination is made as to whether the feedback received about an advertisement is a recommendation. For example, the advertisement targeting service 104 determines whether advertisement feedback 138 received about an advertisement includes a recommendation from a user at a mobile communication device to send the advertisement to one or more of the correlated social contacts 132. If the feedback is a recommendation (i.e., "yes" from block 310), then at block 312, the advertisement is communicated to the mobile communication device that is associated with the social contact based on the recommendation of the advertisement. For example, the advertisement targeting service 104 targets the advertisement 136 as a recommended advertisement 142 to the mobile communication device that is associated with the social contact based on the recommendation of the advertisement.

Alternatively at block 314, the advertisement is communicated to the mobile communication devices that are associated with the social contacts based on the recommendation of the advertisement. For example, the advertisement targeting service 104 targets the advertisement 136 as a recommended advertisement 142 to some or all of the mobile communication devices 108 that are associated with the correlated social contacts 132 based on the recommendation of the advertisement. If the feedback is not a recommendation (i.e., "no" from block 310), then the method continues at block 302 to correlate social contacts.

Figure 4:
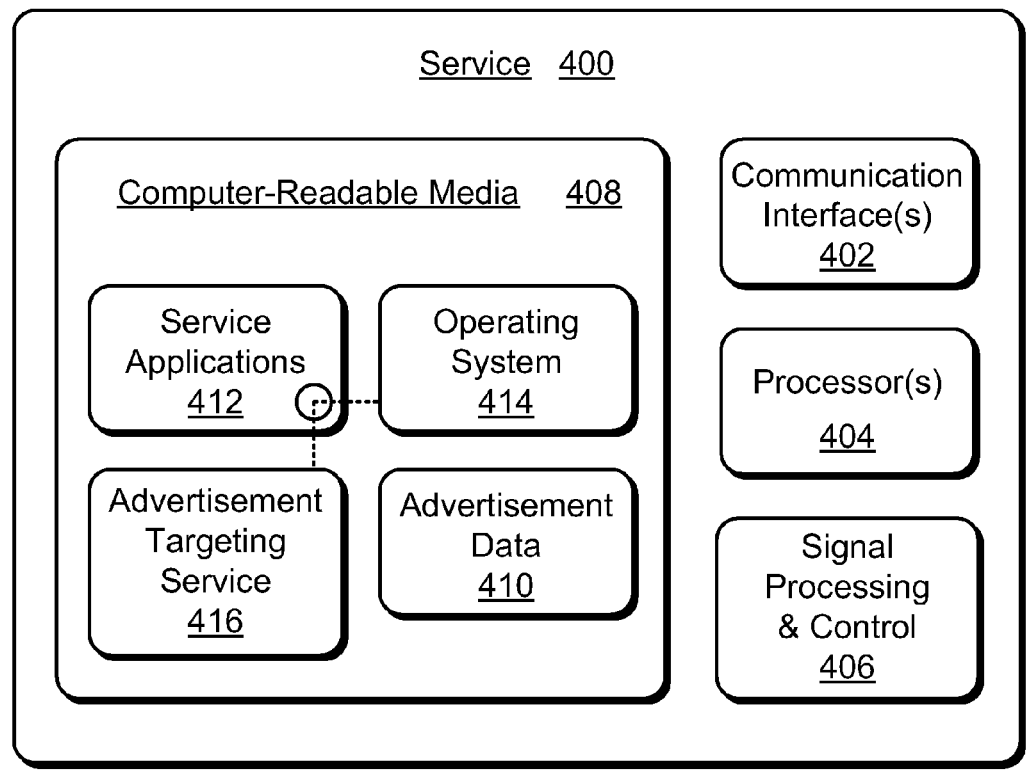
FIG. 4 illustrates various components of an example service that can implement embodiments of targeted advertisements to social contacts.

FIG. 4 illustrates various components of an example service 400 that can implement various embodiments of targeted advertisements to social contacts. In an embodiment, service 400 can be implemented as an advertisement targeting service, such as shown in FIGS. 1 and 2. Service 400 can include one or more communication interfaces 402 that can be implemented as any one or more of a serial and/or parallel interface, a wireless interface, any type of network interface, a modem, and as any other type of communication interface for data, messaging, and/or voice communication. The communication interfaces 402 provide a connection and/or communication links between service 400 and communication network(s) by which other communication, electronic, and computing devices can communicate with service 400.

Service 400 can include one or more processors 404 (e.g., any of microprocessors, controllers, and the like) which process various computer-executable instructions to control the operation of service 400 and to implement embodiments of targeted advertisements to social contacts. Alternatively or in addition, service 400 can be implemented with any one or combination of hardware, firmware, or fixed logic circuitry that is implemented in connection with signal processing and control circuits generally identified at 406.

Service 400 can also include computer-readable media 408, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 408 provides data storage mechanisms to store various types of information and/or data related to operational aspects of service 400, such as advertisement data 410 (e.g., advertisements, advertisement feedback, targeted advertisements, and/or recommended advertisements), and provides storage for various service applications 412. For example, an operating system 414 can be maintained as a computer application with the computer-readable media 408 and executed on the processors 404. The service applications 412 can also include an advertisement targeting service 416. In this example, the service applications 412 are shown as software modules and/or computer applications that can implement various embodiments of targeted advertisements to social contacts.

Although not shown, service 400 can include a system bus or data transfer system that couples the various components within the service. A system bus can include any one or combination of different bus structures, such as a memory bus or memory controller, a peripheral bus, a universal serial bus, and/or a processor or local bus that utilizes any of a variety of bus architectures.

Figure 5:
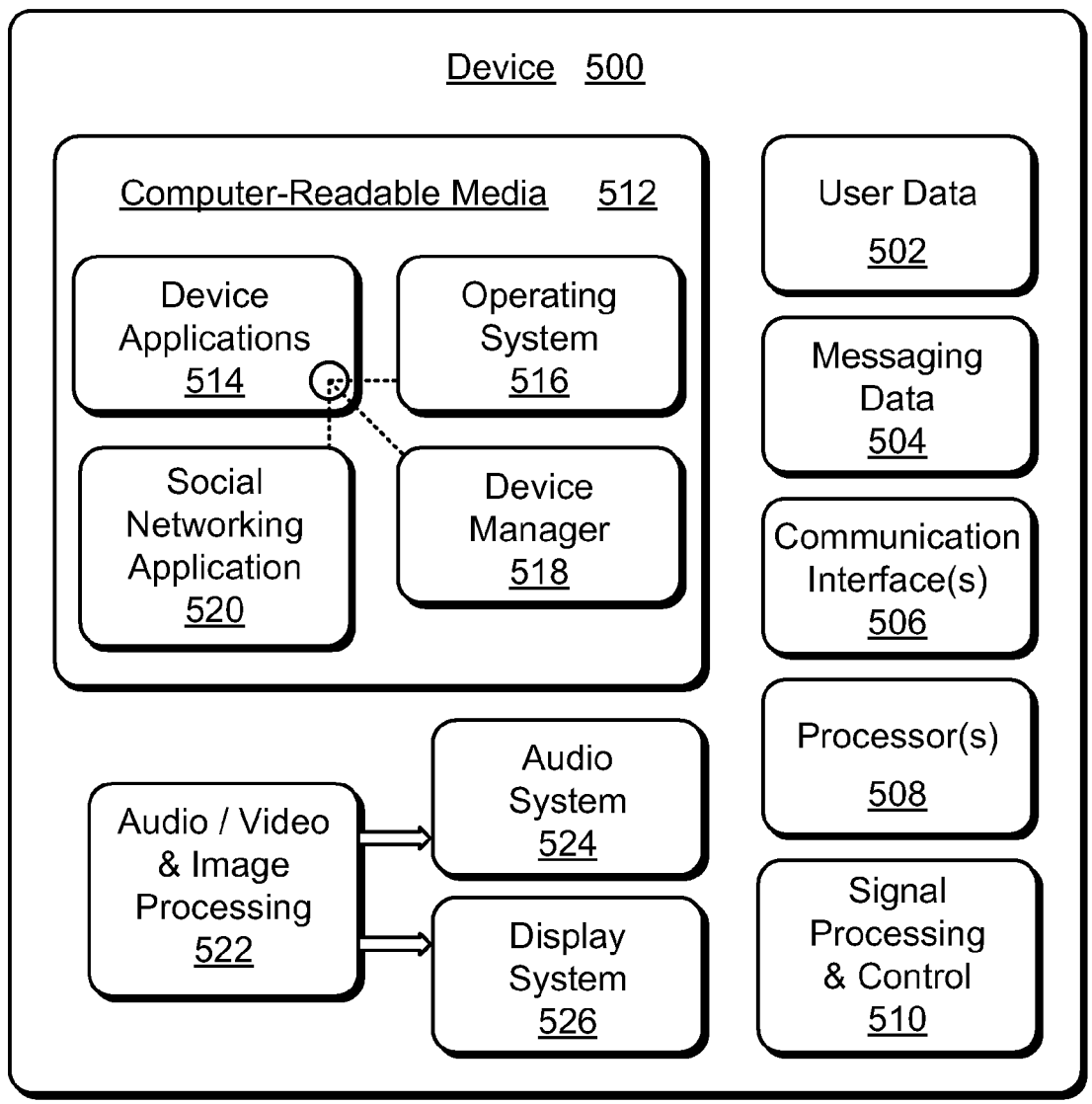
FIG. 5 illustrates various components of an example device that can implement embodiments of targeted advertisements to social contacts.

FIG. 5 illustrates various components of an example device 500 that can be implemented as any form of a mobile communication, computing, electronic, and/or media device to implement various embodiments of targeted advertisements to social contacts. For example, device 500 can be implemented as a mobile communication device 108 as shown in FIG. 1 and/or FIG. 2. In various embodiments, device 500 can be implemented as any one or combination of a wireless or mobile phone, a portable computer device, and/or as any other type of mobile communication device that may be implemented for data, messaging, and/or voice communications.

Device 500 can include user data 502, such as personal information associated with an owner of the device, and can include private information, such as phone numbers, documents, and/or any other personal or business related information that may be stored on the device. Device 500 can also include various messaging data 504, such as for instant messaging, email messages, text messages, pages, and/or other communications. Device 500 further includes one or more communication interfaces 506 that can be implemented for any type of data, messaging, and/or voice communications.

Device 500 can include one or more processors 508 (e.g., any of microprocessors, controllers, and the like) which process various computer-executable instructions to control the operation of device 500 and to implement embodiments of targeted advertisements to social contacts. Alternatively or in addition, device 500 can be implemented with any one or combination of hardware, firmware, or fixed logic circuitry that is implemented in connection with signal processing and control circuits which are generally identified at 510.

Device 500 can also include computer-readable media 512, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 512 provides data storage mechanisms to store the user data 502 and the messaging data 504, as well as various device applications 514 and any other types of information and/or data related to operational aspects of device 500. For example, an operating system 516 can be maintained as a computer application with the computer-readable media 512 and executed on the processors 508. The device applications 514 can also include a device manager 518 and a social networking application 520. In this example, the device applications 514 are shown as software modules and/or computer applications that can implement various embodiments of targeted advertisements to social contacts.

Device 500 can also include an audio, video, and/or image processing system 522 that provides audio data to an audio rendering system 524 and/or provides video or image data to a display system 526. The audio rendering system 524 and/or the display system 526 can include any devices or components that process, display, and/or otherwise render audio, video, and image data. The audio rendering system 524 and/or the display system 526 can be implemented as integrated components of the example device 500.

Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Although embodiments of targeted advertisements to social contacts have been described in language specific to features and/or methods, it is to be understood that the subject of the appended claims is not necessarily limited to the specific features or methods described. Rather, the specific features and methods are disclosed as example implementations of targeted advertisements to social contacts.

The invention claimed is:

1. A method, comprising:
    correlating social contacts with other social contacts in a social graph based on messaging interactions and a frequency of the messaging interactions between mobile communication devices that are associated with the correlated social contacts;
    receiving feedback about a video advertisement from a mobile communication device that is associated with a correlated social contact in the social graph, the feedback comprising a selectable input to select the video advertisement for viewing at the mobile communication device or to dismiss playback of the video advertisement at the mobile communication device; and
    communicating the video advertisement to one or more of the mobile communication devices that are associated with a selected one or more of the correlated social contacts based on the feedback when the feedback comprises the selectable input to select the video advertisement for viewing at the mobile communication device, and not communicating the video advertisement when the feedback comprises the selectable input to dismiss playback of the video advertisement at the mobile communication device.

2. A method as recited in claim 1, further comprising communicating a different video advertisement to the selected one or more correlated social contacts based on the feedback about the video advertisement.

3. A method as recited in claim 1, wherein the feedback received about the video advertisement further includes an additional selectable input to the mobile communication device to rate the video advertisement.

4. A messaging service implemented by a processor, comprising:
    social contacts correlated with other social contacts in a social graph based on messaging interactions and a frequency of the messaging interactions between mobile communication devices that are associated with the correlated social contacts;
    a messaging interface configured to receive feedback about a video advertisement from a mobile communication device that is associated with a correlated social contact in the social graph, the feedback including a selectable input to the mobile communication device to initiate rendering the video advertisement at the mobile communication device or an additional selectable input to dismiss rendering the video advertisement; and
    an advertisement targeting service configured to target the video advertisement to one or more of the mobile communication devices that are associated with a selected one or more of the correlated social contacts based on the feedback when the feedback comprises the selectable input to initiate rendering the video advertisement, and not communicating the video advertisement when the feedback comprises the additional selectable input to dismiss rendering the video advertisement.

5. A messaging service as recited in claim 4, wherein the advertisement targeting service is further configured to target a different video advertisement to the selected one or more correlated social contacts based on the feedback about the video advertisement.

6. A messaging service as recited in claim 4, wherein the feedback received about the video advertisement further includes a further additional selectable input to the mobile communication device to rate the video advertisement.

7. A mobile communication device, comprising:
    at least a memory and a processor to implement a messaging service, the messaging service comprising:
    social contacts correlated with other social contacts in a social graph based on messaging interactions and a frequency of the messaging interactions between mobile communication devices that are associated with the correlated social contacts;
    a messaging interface configured to receive feedback about a video advertisement from the mobile communication device that is associated with a correlated social contact in the social graph, the feedback including a selectable input to the mobile communication device to initiate rendering the video advertisement at the mobile communication device or an additional selectable input to dismiss rendering the video advertisement; and
    an advertisement targeting service configured to target the video advertisement to one or more of the mobile communication devices that are 15 associated with a selected one or more of the correlated social contacts based on the feedback when the feedback comprises the selectable input to initiate rendering the video advertisement, and not communicating the video advertisement when the feedback comprises the additional selectable input to dismiss rendering the video advertisement.

8. A mobile communication device as recited in claim 7, wherein the advertisement targeting service is further configured to target a different video advertisement to the selected one or more correlated social contacts based on the feedback about the video advertisement.

9. A mobile communication device as recited in claim 7, wherein the feedback received about the video advertisement further includes a further additional selectable input to the mobile communication device to rate the video advertisement.

* * * * *